United States Patent [19]

Jordan

[11] 4,116,680

[45] Sep. 26, 1978

[54] COPRODUCTION OF IRON AND CARBON BLACK

[76] Inventor: Robert Kenneth Jordan, 3979 Tuxey Ave., Pittsburgh, Pa. 15227

[21] Appl. No.: 660,934

[22] Filed: Feb. 24, 1976

[51] Int. Cl.² ............................................. C21B 5/00
[52] U.S. Cl. ........................................ 75/41; 106/307; 423/458; 423/459
[58] Field of Search ............... C01B/31/02; 75/41, 42, 75/40, 133.5; 423/458, 459; 252/425, 373; 106/307

[56] References Cited

U.S. PATENT DOCUMENTS

| 1,964,744 | 7/1934 | Odell | 423/459 |
| 2,173,695 | 9/1939 | Reed | 252/373 |
| 2,322,989 | 6/1943 | Wilcox et al. | 252/373 |
| 2,337,551 | 12/1943 | Hansgirg | 252/373 |
| 3,232,746 | 2/1966 | Karlovitz | 423/459 |
| 3,347,633 | 10/1967 | Johnson | 106/307 |
| 3,460,934 | 8/1969 | Kelmar | 75/42 |
| 3,464,793 | 9/1969 | Jordan et al. | 423/459 |
| 3,630,719 | 12/1971 | Craig | 75/41 |
| 3,861,885 | 1/1975 | Schora | 423/459 |
| 3,950,267 | 4/1976 | Arakawa et al. | 252/425 |
| 4,013,454 | 3/1977 | Jordan | 75/41 |

OTHER PUBLICATIONS

Liuti, G. et al.; *Photochemical Production of $C_3O_2$ From CO*, in *Journ. Chem. Phys.*, 44 (10) 1966 pp. 4051–4053.

*Primary Examiner*—Walter R. Satterfield

[57] ABSTRACT

A process wherein a blast furnace is operated with oxygen instead of air to provide hot metal and a top gas of essentially carbon monoxide which is disproportionated, or decomposed, to carbon black.

2 Claims, No Drawings

COPRODUCTION OF IRON AND CARBON BLACK

This invention relates to the simultaneous production of a ferrous metal and carbon black by operation of a modified blast furnace with oxygen to provide a top gas of carbon monoxide which is disproportionated over known catalysts to carbon black.

Carbon black is a finely divided form of carbon whose sizes range up to several hundred microns in a wide variety of shapes. Its principal use lies in rubber reinforcement which enables dilution or plasticizing with cheap oils without significant losses in properties. The result is for example, an oil-extended rubber composition of perhaps a third each rubber, carbon black and oil. Heretofore both the oil and carbon black have been very cheap as compared to the rubber used. For emphasis only, in 1970 the cost of these materials was 20 cents a pound for rubber, 6 cents a pound for carbon black and 2 cents a pound for oil so that it is easily seen that the above composition would amount to 28 cents for three pounds or about 9 cents a pound. Thus the composition cost about half as much as the rubber and surprisingly the composition had properties nearly those of the rubber. Carbon black is made by the degradative partial combustion of hydrocarbons using a deficiency of oxygen or air in various kinds of furnaces. Heavy petroleum oils are used in the production of carbon blacks used in rubber which a few carbon blacks used in inks are produced from acetylene and natural gas, mostly because the products from oil contain unreacted oil or oily residues. In any event what ever feedstocks of these, all are expensive or in short supply or both so that there is now not such a great differential between the cost of rubber and carbon black. Moreover, because carbon black is very low in bulk density its shipping cost is high because in one way or another it must be transported from the manufacturing points of the Southwest to the markets in the Northeast, a considerable distance.

It has long been known that carbon blacks can be produced by the disproportionation of carbon monoxide, i.e., $2 CO \rightarrow C + CO_2$, but for several reasons carbon monoxide in a sufficiently concentrated form is much too expensive by conventional processes. These include (a) reforming natural gas with steam in an expensive energy consuming reformer to synthesis gas, a mixture of carbon monoxide and hydrogen, which is then separated by a cyrogenic method, and (b) the partial combustion of special anthracite coals and coke with pure oxygen in a Wellman-Gallusa furnace. Such carbon monoxide is used only in expensive chemicals such as isocyanates and acetic acid.

Therefore, it is an object of my invention to provide an improved process for the production of carbon black.

My invention is a process for the simultaneous production of a ferrous metal and carbon black comprising operating a modified blast furnace so modified to operate with oxygen and at least one of carbon oxides to provide hot metal and a top gas containing at least 50 percent carbon monoxide, said top gas being decomposed to carbon black.

I have disclosed that carbon black can be made simultaneously with a ferrous metal via a modified blast furnace operated with oxygen and recycled top gas, instead of hot air used in a conventional blast furnace, to provide a top gas of essentially carbon monoxide which is disproportionated to carbon black. In my copending application Ser. No. 634,613 filed Nov. 24, 1975 and entitled Carbonaceous Fines In An Oxygen-Blown Blast Furnace I disclose the operation of a modified blast furnace, ideally without stoves, by replacing the hot air blast with an oxygen-carbon oxides, ideally recycled top gas carbon oxides fed separately from the oxygen, resulting in the partial combustion of the coke or coal at very high flame temperatures to produce hot metal at an increased rate and provide a top gas of 70 to 80 percent carbon monoxide, the remainder being almost all carbon dioxide. A typical furnace so operated can produce gaseous carbon monoxide at such a rate that it must be utilized immediately either as a fuel or as a chemical raw material since gas holders for such quantities do not exist and its cost of liquefaction and storage as a liquid is prohibitively high.

Ideally the furnace would be operated as described in my copending application noted above, using roughly a half ton of 90–95 percent gaseous oxygen and a like amount of recycled top gas (of 80 percent carbon monoxide-20 percent carbon dioxide), the latter fed separately, i.e., either being fed through pipes extending through the tuyeres or through separate tuyere systems, for each ton of hot metal produced. The oxygen alone would partially combust the coke at temperatures that would burn holes in the burden, so in using recycled top gas to absorb heat and temper the flame to a high of roughly 4,000° F. Only very minor amounts of nitrogen are present in the essentially pure carbon monoxide which is the active reducing agent of iron oxides and in the process of the reduction becomes partly oxidized to carbon dioxide while rising in the furnace which accounts for the composition of the top gas.

Lower purily oxygen, for example about 60 percent oxygen-40 percent nitrogen, can be used if the top gas is to be disproportioned to carbon black since the carbon monoxide concentration would still be well about 70 percent in the top gas. This compared to an average of perhaps 25 percent in conventional blast furnace, clearly too low to be effectively utilized in either chemicals or carbon black. The flame temperature of the oxygen-blown furnace may also be tempered by the addition of steam, natural gas or reformer gas in which cases the top gas would contain hydrogen. In limited concentrations hydrogen does not greatly affect the disproportionation of carbon monoxide to carbon black. While is is practically impossible to select a limit to the dilution permissable, it is reasonable to state that the top gas should contain about 50 percent carbon monoxide as a minimum. The temperature of operation of the modified oxygen-blown furnace has very little effect on the composition of the top gas with respect to its utility in the production of carbon black. Likewise the coke rate does not greatly affect the composition of the top gas, nor does injected coal except to add minor amounts of hydrogen, but a low carbon rate is ideal to the economic operation of the oxygen-blown furnace and hopefully such carbon rates might be less than a half ton per ton of hot metal. Under the more ideal conditions of operation a ton of carbon monoxide will be contained in the top gas for each ton of hot metal produced. Also it should be noted that the oxygen-blown furnace is most ideally applied to the production of ferro-manganese, but such a relatively low market exists for it that most of the hot metal produced will be iron containing up to about 4.5 percent carbon, that usually obtained from a conventional blast furnace.

The top gas from conventional blast furnaces and that expected from the oxygen blown furnace contains particulate matter and minor amount of gaseous impurities such as carbonyl sulfide, hydrogen sulfide, moisture and methane, among others. Ideally the particulate matter should be removed from the top gas from the oxygen-blown furnace to be used in the production of carbon black. But as will be seen later, if iron oxide catalysts are to be used subsequently in the disproportionation of the contained carbon monoxide to carbon black there is no compelling reason other than other particles of size must be removed anyway. The particulate matter, and some of the gaseous contaminants, can be removed by any number of known processes including cyclones, precipitators, electric precipitators, water washing and filters. Also it should be noted that the top gas from the furnace will be initially at a temperature above 300° F, this being a normal practice to avoid the possibility of water condensation within the furnace. To the extent that the particulate matter can be removed without water washing this offers a way for conserving a small amount of energy, since the temperature for the disproportion will range from this to about 2000° F.

Present blast furnaces operate at top pressures ranging up to about 2 atmospheres. Clearly by the law of mass action pressure should favor the process since 2 moles of gas, carbon monoxide, results in solid carbon and one mole of carbon dioxide. A considerable amount of work has been conducted on the disproportionation of carbon monoxide to carbon black and carbon dioxide, but very little has been directed to the practical production of the product. Again it is indicated in various work that pressure leads to increased rates but in this study the advantage of pressures above atmospheric lays in enabling a reduction in the size of the equipment. It is not foreseen that such pressures so high as to greatly increase the cost of equipment would be used, a maximum of a hundred atmospheres appears reasonable as an upper limit. But ideally the process of disproportionation should be conducted at temperatures in the range of from about 600° F to about 1400° F at a pressure ranging from atmospheric pressure to 20 atmospheres.

In systems handling carbon monoxide, even in diluted form at temperature upwards of 400° or 500° C, the deposition of carbon occurs unexplainably in the absence of particulate matter. Carbon monoxide disproportionation by shock is reported in the Australian Journal of Chemistry 1960,2(11),2631–40, ultraviolet and visible light as reported in the Journal of Chemical Physics 44(10),4051–2 and 4052–3 respectively in 1966, by electrical discharge in Vestn. Mosk. Univ. Ser.II Khim. 21(2),36–8(1966), by gamma radiation in Naturforsch. A22(6),954–60(1967) and many others note other forms of energy causing carbon monoxide decomposition. It is very apparent then that at temperatures of above some 400° F every form of energy applied in some way causes carbon monoxide to decompose to solid carbon products, mostly carbon black. With respect to photochemical disproportionation it has been noted that sensitizers increase the rate and degree of conversion, i.e., Journal of Chemical Physics 44(10),4051–2(1966). Clearly the ideal industrial process for the production of carbon black would be one in which some form of energy were used to induce deposition as this would provide an uncontaminated product.

Thus the ideal form of induced deposition would be through an ultrasonic generator as such are cheap to operate and can be installed with the gas handling equipment. Machine radiation such as that available from Van Der Graff generators and other devices producing narrow and wide ranges of radiation, could also be utilized economically. Radiation as available from $Co^{60}$ and $Cs^{137}$ has the advantage that either could be installed with the gas handling system, but the disadvantage that radioactive isotope leakage would cause great problems. Even lamps can be utilized as it is possible to continually wash the outer surface (in contact with the top gas) with a liquid which is transparent to the light wavelength desire to cause deposition. Likewise an inert gas can be blown along the surface to achieve essentially the same result. Devices to inject shock waves into a reactor or tube is also presumed within the scope of modern engineering technology. Again the great advantage of carbon black by the induction of carbon monoxide disproportionation with some form of transmittable energy lies in the ease of obtaining an uncontaminated product. For example in the utilization of a silent electric discharge machine, the carbon monoxide would simply be passed between the plates. And since in this case there is a slight induction period, actual deposition would occurs beyond the plates so that buildup of carbon would be slow. But even with an accumulation removal from the surface can easily be accomplished by remotely controlled physical mean or achieved ultrasonically. Clearly the product carbon black would contain no contaminants if microwave energy were used to cause deposition.

The required physical properties of the carbon black in terms of size and shape are controllable by the well known parameters of wave length of the energy, its intensity, residence time, temperature and pressure. For example an article in Ric. Sci. Rend. Ser A 8(2),163–5(1965) describes the variation of products of carbon monoxide decomposition at somewhat lower temperatures in a silent electric discharge over a range of from 4,800 to 12,000 volts.

The addition of gaseous compounds or elements to the carbon monoxide under the influence of various kinds of energy can also affect the deposition and the nature of the products. Again at evidentally a lower temperature it is described in Naturforschung A22(6),9-54–60(1967) how in gamma radiation alone apparently only carbon and carbon dioxide are formed, but by adding methane, ethylene, oxygen or nitrous oxide under the same conditions leads to some carbon suboxide. Clearly at higher temperatures this carbon suboxide would take the form of another kind of carbon in terms of shape, size, propsity or some other characteristic. Incidentally it should be noted that even at elevated temperatures low concentrations of oxygen can be stable in carbon monoxide.

If homogenous catalysts work to cause the disposition of carbon in conjunction with light, radiation and electrical discharge, it is proper to assume that the action of heat alone can induce homogeneous gases to act as catalysts in the decomposition. Certainly this would be true of gaseous metal carbonyls which are stable as gases at lower temperatures and are known to interact with carbon monoxide. Likewise gaseous aluminum chloride, boron trifluoride and other volatile stable gases (if the carbon monoxide is water free) would induce changes in carbon monoxide at the temperature of the instant process and clearly water could easily be removes from the top gas by passing the gas through water absorbing molecular sieves.

By far and away most work published on the disproportionation of carbon monoxide reports on the use of solid catalysts, of which various forms of metallic iron and iron oxides have received most attention. It turns out that using such catalysts leads to carbon black containing up to 5 or 6 percent iron and iron oxides. It is reported that during World War II such carbons containing about 5 percent iron oxides were treated with aqueous hydrochloric acid, leaching the product to such an extent that the final product contained only or less than a half percent iron. The trouble with producing a carbon black commercially using an iron oxide catalyst is that the product would contain iron which is very deleterious to unsaturated rubbers, including SBR, natural rubber, polyisopresne, cis-polybutadiene and others, causing very rapid degradation. Other metals and metal oxides have similar effects on rubbers. Those metals and their oxides reported on after those of iron include cobalt, manganese and zinc. There is a report, US AEC GA5215(1964)18 pp, stating that barium (5 percent) impregnated on activated carbon at 500° C produces a catalytic effect of 1,000.

No doubt a continued concerted effort will discover a myriad of compositions which will have strongly catalytic effects on the disproportionation of carbon monoxide to carbon monoxide. An interesting fact is the role of temperature alone with a single solid catalyst, iron, which is said to act in three distinct ways on the process depending on temperature. It is clear then that with solid catalyst too a degree of control on the nature of the products is possible through such factors as concentration, temperature, rate of flow, pressure, etc.

It is clearly undesirable to have to leach catalyst residues and other undesirable materials from carbon blacks produced by the disproportionation of carbon monoxide. But that is what must be done, sobeit and practically any mineral acid can be used to leach iron and its oxide including hydrochloric, sulfuric and hydrofluoric acids since all these salts of iron are quite soluble. Even organic acids, for example trifluoroacetic acetic acid, can be used to extract metals and their oxides from products.

The use of known catalysts, homogeneous and heterogenous catalysts, is not claimed to be new in any sense, nor is the leaching of the carbon black produced. Rather it is the process of coproducing carbon black with hot metal via carbon monoxide provided by operating a modified blast furnace with oxygen. There are many advantages to make carbon black in this way as compared even with the use of conventional blast furnace top gas. Conventional blast furnace top gas is comprised of typically 55 percent nitrogen, 25 percent carbon monoxide and 20 percent carbon dioxide. No doubt the contained carbon monoxide can in part be disproportionated by the means noted above, but clearly because it is so dilute the degree of conversion or percent conversion of the carbon monoxide would be very low. This is analogous to the conversion of the carbon monoxide in the same top gas to methyl formate using a sodium methoxide catalyst. Under the same conditions at 100 percent concentration of carbon monoxide the conversion and yield is practically quantitative. At 50 percent carbon monoxide concentration the conversion is roughly 70 percent, and of course since it is impractical to recycle such gas the yield is the same. With 25 percent carbon monoxide the conversion and yield fall well below 50 percent. But what makes the dilute carbon monoxide much worse in terms of energy is that the residual gas would have a carbon monoxide concentration of 15 percent or less so that its heating value would be about 40 btus per cubic foot, probably and in fact too low to even be burned in a boiler for producing steam. On the other hand using oxygen furnace top gas of 80 percent carbon monoxide at 50 percent conversion would result in a residual gas containing 40 percent carbon monoxide which would have a heating value of about 125 btus per cubic foot which is sufficiently high for use as a fuel. Moreover as it would be diluted only be easily removalble carbon dioxide, the carbon monoxide is readily and economically upgradable for chemical use or recycle. Whatever the conversion to carbon black, the carbon monoxide in the unreacted gas would still be useful. Since typical blast furnace top gas is only 70–90 btus per cubic foot in heat content, any significant conversion would result in a useless residual gas so that the efficiency would approximate the percent conversion, which unfortunately cannot be very high because of the low carbon monoxide and high nitrogen concentrations.

Another advantage to the instant process lies in the size and therefor cost of the equipment required to handle either a given quantity of carbon monoxide or product carbon black. Clearly the equipment required for converting conventional blast furnace top gas will have to be at least four times as large as that needed for converting oxygen-blown furnace top gas. Likewise, were it decided beneficial to conduct the process at elevated pressure, the use of conventional blast furnace top gas would necessitate several times more compressors to handle the gas as compared to oxygen-blown blast furnace top gas.

The comparative energy relationships are similar. To provide one ton of carbon monoxide in top gas from a conventional blast furnace requires required heating roughly 4 tons of top gas to the temperature of the disproportionation reaction whereas no more than a ton and a half of oxygen-blown top gas need be heated to the same temperature to provide a ton of carbon monoxide. As the conversion will be very much lower using the conventional top gas, the ratio of heat required per given quantity of carbon black becomes almost astronomical in comparison with that using oxygen-blown top gas. The necessity to use pressure would clearly result in similar energy ratios, again because of the tremendous amount of nitrogen and carbon dioxide accompanying each unit of carbon monoxide of conventional blast furnace top gas.

According to the provision of the patent statutes. I have explained the principle of my invention and illustrated and described what I now consider to represent its best embodiment. However, I desire to have it understood that within the scope of the appended claims, the invention may be practiced otherwise than as specifically illustrated and described.

I claim:
1. A process for the simultaneous production of a ferrous metal and carbon black comprising,
   a. operating a ferrous metal blast furnace, modified by obviating the stoves and equipped to recycle a part of the top gas to the combustion zone, with a carbonaceous fuel combusted with oxygen in the presence of recycled gas of at least one of carbon monoxide and carbon dioxide to produce a molten fer- rous metal and a top gas of carbon monoxide and carbon dioxide, b. disproportionating the contained carbon monoxide of the cleaned remaining top gas to carbon black and carbon dioxide.

2. The process of claim 1 wherein said disproportionation is at least in part induced by some form of transmitable energy at a temperature in the range of from about 300° F to about 2000° F.

* * * * *